Figure 1:
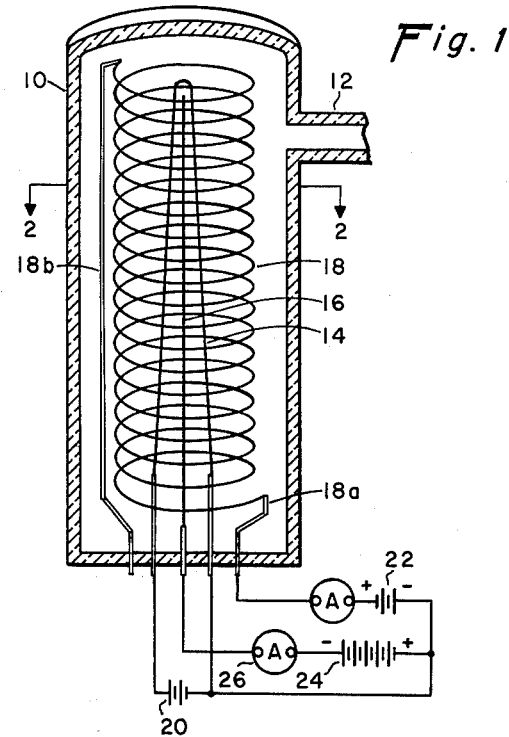

Jan. 30, 1962

G. W. HEES 3,019,360

IONIZATION VACUUM GAUGE

Filed Nov. 27, 1959

INVENTOR.
GEORGE W. HEES

BY

*Spencer E. Olson*

ATTORNEY

United States Patent Office 3,019,360
Patented Jan. 30, 1962

3,019,360
IONIZATION VACUUM GAUGE
George W. Hees, Williston Park, N.Y., assignor to Sylvania Electric Products Inc., a corporation of Delaware
Filed Nov. 27, 1959, Ser. No. 855,685
2 Claims. (Cl. 313—7)

This invention relates to apparatus for measuring very low gas pressures, such as those within evacuated chambers, by measurement of an ionization current established within the rarefied atmosphere of the gas.

As is well understood in the art to which the invention pertains, very low gas pressures may be measured by providing within the gaseous atmosphere a cathode, a positively charged anode arranged to accelerate and collect electrons emitted from the cathode, and a negatively charged collector electrode arranged to collect positively charged gaseous ions generated by impact of the electrons with gaseous molecules. In general, the total number of ions collected for a constant electron current affords a meausre of the gas pressure.

Ionization vacuum gauges of the prior art, all employing this general principle, have taken three general different forms. In one form, the cathode is provided in the center of the tube and is surrounded by an acceleration electrode of wire mesh. External to the acceleration electrode is a plate or ion collector, which may be a band of conductive material evaporated onto the tube envelope, which is negative with respect to the cathode. Electrons emitted from the cathode are accelerated by the acceleration electrode to high velocities. These electrons moving about the tube cause ionization of the gas within the tube, the number of ions produced per unit time being proportional to the pressure of the gas within the tube, provided the other variables affecting the operation remain constant. The ions thus produced are collected by the ion collector electrode, and the current produced by the ions is measured to give an indication of the degree of vacuum within the tube.

In another form, in an effort to reduce the deleterious effects thought to be produced by X-rays caused by electrons striking the acceleration electrode with high velocities, the collector electrode comprises a fine wire of conducting material positioned centrally of the tube. Surrounding this collector electrode is an acceleration electrode, in the form of a spiral of thin wire, and external to the acceleration electrode is a cathode. The collector electrode, which is located inside the acceleration electrode, has a potential impressed thereon which is negative with respect to the cathode and therefore also negative with respect to the acceleration electrode. With this arrangement, the positive ions which are attracted by the negative potential on the ion collector electrode are prevented from escaping into the space outside the accelerator electrode by the positive potential on that electrode. The amount of X-radiation which is intercepted by the ion collector electrode may be made arbitrarily small by making the ion collector electrode arbitrarily small.

In still another form of ionization vacuum gauge tube, a fourth electrode, in addition to the three of the tube described in the immediately preceding paragraph, is positioned within the cylindrical acceleration electrode. It also has a positive potential relative to the cathode and is so arranged with regard to the cathode and collector electrode as to collect a variable part of the electrons in accordance with the potential of the collector electrode.

Each of the configurations of the prior art have certain limitations, some of which are compensated by the designs of the others, which limits their use in the measurement of very low pressures. Comparative tests have revealed that the first-described tube has good sensitivity, but that the pressure-collector current characteristic of the tube becomes non-linear at pressures below about $10^{-8}$ millimeters of mercury. This non-linearity may be due in part to the X-radiation intercepted by the collector electrode.

The next-described tube, having a fine wire collector, has a pressure-collector current characteristic which is linear to lower pressures, but the sensitivity of the tube is objectionably low. This low sensitivity may be due to the fact of the "in line" arrangement of the filament and collector, respectively outside and inside the cylindrical grid, whereby the effective volume of the tube is limited to a narrow region surrounding the collector and filament and that portion of the grid crossed by a line connecting the collector and filament. Further, ions found outside the grid (i.e., in the filament-grid volume) may not be counted due to repulsion by the positively charged grid. In short, the structure of the last two described tubes is such that the efficiency of ionization and positive ion collection is low; that is, the sensitivity of the tube is marginal.

It is to be noted, also, that the latter two constructions requires the location of the filamentary cathode outside the cylindrical acceleration electrode; this increases the bulb diameter necessary to contain the electrodes of the gauge. Also, the closer the filament is to the bulb, the more the glass can release adsorbed gas and thus adversely affect the accuracy of the pressure measurement.

With an appreciation of the foregoing limitations of prior are ionization vacuum gauges, applicant has for a general object of the present invention the provision of an improved apparatus of increased sensitivity whereby substantially smaller gaseous pressures may be measured, or whereby pressures now measurable may be measured with a higher degree of precision.

It is another object of the invention to provide an improved tube construction having features which permit the use of a smaller diameter envelope to contain the electrodes of the tube.

Still another object of the invention is to provide a tube construction having features simplified for more convenient and economical manufacture, for example, simplification of the operation of degassing, which is, of course, generally necessary with all gaseous pressure measurements of the type to which the invention pertains.

The attainment of the foregoing objects is based on the realization by applicant that it is unnecessary to have the cathode and collector electrode on opposite sides of the acceleration electrode; i.e., the collector inside the cylindrical grid electrode and the filamentary cathode outside, or vice versa. Heretofore, the cylindrical accelerator electrode has been regarded as a grid, whereas its real function is to establish in cooperation with the cathode, a potential gradient for accelerating electrons emitted by the cathode to a velocity sufficient to generate positive gaseous ions by impact of the electrons with gaseous molecules. To obtain ionization of the gas in a rarefied atmosphere, it is necessary only that the cathode and accelerating electrode be separated, and that means be provided in the region where the ions are formed to collect the ions.

To this end, the ionization gauge in accordance with the invention features an elongated cylindrical accelerating electrode, which may be in the form of a wire wound into a helical structure, a filamentary cathode disposed within the accelerating electrode, and an ion collector also positioned within the accelerating electrode. The accelerating electrode is charged positively relative to the cathode whereby electrons emitted by the cathode are accelerated radially outward toward the accelerating electrode whereby substantially the entire volume within the helical accelerating electrode is subjected to high velocity electrons which can ionize gas molecules in which they come in contact in traveling to the accelerating electrode. The collector electrode, which is negatively charged relative to the cathode and the accelerating electrode, collects the positive ions generated by such collisions which constitutes a measure of the pressure within the tube. The efficiency is thus enhanced since most of the electrons travels only within the space between the cathode and the accelerating electrode, with substantially uniform electron density within the volume, and substantially all of the positive ions which are generated are confined within the accelerating electrode where they can be efficiently collected. Since none of the tube elements is external of the accelerating electrode, the tube envelope need only be large enough to contain the accelerating electrode, thus permitting the use of a smaller bulb than has been required for prior art tubes.

Figure 2:
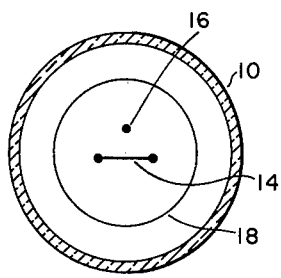
Figure 3:
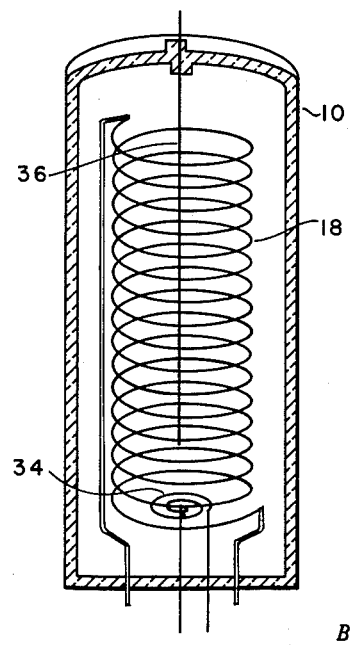

Other advantages of this construction from the viewpoint of simplicity of manufacture and operation will be apparent from the following description, taken in connection with the accompanying drawings, in which:

FIGS. 1 and 2 are respectively side and top views of one form of vacuum gauge according to the invention; and FIG. 3 is a schematic representation of another form of ionization gauge embodying the invention.

The apparatus shown in FIG. 1 includes an envelope 10 of glass or other material which is impervious to gases. Connected to the side of the envelope 10 is a pipe or tubulation 12 for connecting the tube to a vacuum system, the pressure in which is to be measured. Supported in the lower end closure of the envelope and extending into the tube is a heated cathode 14, which may be of inverted V-shape as shown. Attached near the same end of the tube and extending into the tube is an ion collector comprising a thin wire 16 of conducting material, slightly displaced from the plane of the filamentary cathode 14, as shown in FIG. 2. The acceleration electrode 18 may consist of a thin wire formed into a helix supported at the lower end on a support 18a sealed in the end closure of the envelope and at the upper end by a stiff wire 18b extending along the outside of the helix and sealed in the lower end closure of the bulb 10. The wire of which the helix 10 is formed is of sufficiently heavy gauge and stiffness that adjacent turns do not come in contact with each other, even when subjected to heating current for outgassing. Alternatively, the acceleration electrode may be a double reverse-wound helix with the entire structure supported at the bottom. The helix 18 surrounds both the cathode 14 and collector 16 and is of a diameter to afford a sufficiently long path in which electrons can encounter gas molecules for ionization purposes. As shown in the drawing, the cathode 14 is connected to a source 20 of heating current. A potential is applied between the cathode 14 and accelerator electrode 18 by source 22 such that the accelerator electrode is positive with respect to the cathode. The ion collector 16 has a potential applied thereto from source 24 which is negative with respect to both the cathode and the acceleration electrode.

In the operation of the ionization gauge of FIG. 1, electrons from the cathode 14 are accelerated by the acceleration electrode 18 toward that electrode. Since the ion collector 16 is negative with respect to the cathode and the acceleration electrode, the electrons will be repelled by these electrodes and will move radially outward toward the acceleration electrode. As the electrons move outwardly toward the accelerator electrode, with high velocities, some of them will strike molecules of the gas in the volume defined by the acceleration electrode and thereby cause ionization of the gas. The positive ions which are produced by this ionization are attracted toward the ion collector 16 which is negative.

If the current of electrons through the tube is held constant, the number of ions produced per unit time will be substantially proportional to the pressure of the gas inside the tube. Therefore since the current passing from the ion collector electrode through the ammeter is proportional to the number of ions which reach the collector electrode per unit time, the reading on the ammeter 26 is an indication of the pressure in the tube.

It will be appreciated that the described construction of the electrodes of the tube simplifies the step of degassing the electrodes. The acceleration electrode 18 being formed of a continuous wire and having accessible terminals external of the envelope may be heated to temperatures necessary for outgassing by passing current through it. The wire of the helix is of sufficiently heavy gauge as to be self-supporting even when heated to a bright red. Some of the prior art tubes to which reference has been made require the use of more inconvenient methods, such as heating by induction or electron bombardment, to accomplish out-gassing.

Refering now to FIG. 3, there is shown an alternative embodiment of the invention in which the cathode is in the form of a flat spiral 34 lying in a plane perpendicular to the axis of the accelerating electrode 18 and positioned near one end of the volume defined by the accelerating electrode. The collector electrode, which may be a single fine wire 36, is preferably, but not necessarily, supported at the other end of the envelope and extends centrally along the volume bounded by the accelerating electrode toward the catohde 34. Here again, electrons emitted from the cathode are accelerated toward electrode 18 and generate positive ions upon collision with gaseous molecules in this volume. The positive ions are collected on the collector electrode 36, which is negative with respect to the cathode 34 and the accelerating electrode 18, to provide a measure of the pressure within the volume.

From the foregoing it is seen that applicant has provided an improved ionization type vacuum gauge wherein the source of electrons, the collector and the acceleration or grid electrode are so positioned relatively to each other as to produce ionization in the grid-collector volume of the tube. More particularly, the source of electrons and the ion collector are both positioned within the volume defined by a hollow cylindrical acceleration electrode. This construction offers the advantages of a smaller envelope for the electrodes, a more uniform electron density within the active volume of the tube, and better ion collection efficiency.

Although there has been shown and described specific embodiments of the invention, other modifications may now be suggested to one skilled in the art. The invention therefore is not to be restricted except insofar as such limitations appear in the appended claims.

What is claimed is:

1. An ionization vacuum gauge comprising, in combination, an envelope of material impervious to air, an acceleration electrode in said envelope comprising a conductor wound in helical form and defining an elongated substantially cylindrical volume, an ion collector comprising a thin conductive wire positioned substantially along the longitudinal axis of said cylindrical volume, and a thermionic cathode of flat spiral shape positioned at one end of said cylindrical volume and normal to the longitudinal axis of said volume.

2. An ionization vacuum gauge comprising, in combination, an envelope of material impervious to air, an acceleration electrode in said envelope comprising a conductive wire wound in helical form and defining an elongated cylindrical volume, an ion collector comprising a thin conductive wire supported on said envelope and extending along the longitudinal axis of said cylindrical volume from a first end thereof, and a thermionic cathode of flat spiral shape positioned across the other end of said volume and normal to the longitudinal axis of said volume.

References Cited in the file of this patent

UNITED STATES PATENTS 2,790,949     Ottinger _____ Apr. 30, 1957